United States Patent [19]

Okayama

[11] Patent Number: 5,224,026
[45] Date of Patent: Jun. 29, 1993

[54] ALTERNATABLE CONSTANT CURRENT CIRCUIT

[75] Inventor: Tsutomu Okayama, Katsuta, Japan

[73] Assignee: Hitachi, Ltd., Tokyo, Japan

[21] Appl. No.: 901,776

[22] Filed: Jun. 22, 1992

[30] Foreign Application Priority Data

Jun. 24, 1991 [JP] Japan .................. 3-150727

[51] Int. Cl.⁵ .......................... H02M 3/335
[52] U.S. Cl. ....................... 363/21; 363/63;
363/97; 307/127
[58] Field of Search ............ 307/127; 363/15, 16,
363/20, 21, 63, 97, 131

[56] References Cited

U.S. PATENT DOCUMENTS

| | | | |
|---|---|---|---|
| 2,972,710 | 2/1961 | D'Amico | 307/127 |
| 3,770,986 | 11/1973 | Drehle | 363/63 |
| 4,409,527 | 10/1983 | Sommeria | 363/63 |
| 4,454,573 | 6/1984 | Petsch et al. | 363/63 |
| 4,494,181 | 1/1985 | Ramlohr et al. | 363/63 |
| 4,545,004 | 10/1985 | Kade et al. | 363/63 |
| 4,651,269 | 3/1987 | Matsumura | 363/63 |
| 4,989,114 | 1/1991 | Storti et al. | 307/127 |
| 5,010,279 | 4/1991 | Lathom et al. | 363/63 |

FOREIGN PATENT DOCUMENTS 58-56007 4/1983 Japan .
64-12226 1/1989 Japan .

*Primary Examiner*—Steven L. Stephan
*Assistant Examiner*—Jeffrey Sterrett
*Attorney, Agent, or Firm*—Antonelli, Terry, Stout & Kraus

[57] ABSTRACT

An alternatable constant current circuit is provided which supplies positive and negative polarities of rectangular wave current to an inductive load such as in an exciting circuit of an electromagnetic flowmeter and in a slanted magnetic field system of a nuclear magnetic resonance imaging device at a high current inversion speed and a low power loss, wherein the capacitance of an output capacitor in a switching power source circuit is lowered, the regenerative output voltage of the output capacitor is applied to the inductive load during the current inversion period therein via a polarity inversion circuit, further the load current is controlled by a current control circuit at a predetermined value and the output voltage of the switching power source circuit is also controlled so as to maintain the collector-emitter voltage Vce of a current control transistor in the current control circuit constant, whereby an oscillation is generated in the circuit including the inductive load and the output capacitor during the current inversion to charge the output capacitor to an excessively high voltage and further the output voltage of the output capacitor in the switching power source circuit rises due to a decrease of the collector-emitter voltage Vce thereof to thereby cause an output voltage jump-up of the output capacitor and to hasten the current inversion in the inductive load.

4 Claims, 5 Drawing Sheets

ALTERNATABLE CONSTANT CURRENT CIRCUIT

BACKGROUND OF THE INVENTION

1. Field of the Invention

The present invention relates to an alternatable constant current circuit and in particular, relates to an alternatable constant current circuit which inverts at a high speed current flowing through an inductive load such as in an exciting circuit of an electromagnetic flowmeter and in a slanted magnetic field system of a nuclear magnetic resonance imaging device.

2. Description of Related Art

In conventional art, many alternatable constant current circuits were constituted by combining a DC constant current circuit with a switching circuit for changing-over the polarity.

For example, the alternation of current fed to an inductive load Lx is performed by changing-over the direction of a DC output current with a bridge type switching circuit as shown in FIG. 2 or by changing-over two DC output voltages of positive and negative potentials in a switching power source circuit with a pair of switching circuits as shown in FIG. 3.

In FIG. 2, the output of a DC power source 1 which is obtained by rectifying the output of a commercial AC power source is applied to an inductive load Lx by changing-over the polarity thereof with a bridge type switching circuit 3 constituted by switches S1~S4, the load current is detected by a resistor Rs and is compared with a reference voltage Vr, and the resultant error voltage is amplified at an error amplifier EA to drive a transistor Q1 for current control so as to maintain the collector current constant, wherein the current control transistor Q1, the current detecting resistor Rs, the reference voltage Vr and the error amplifier EA inclusively constitute a current regulating circuit 4.

In FIG. 3, the output of a DC power source 1 is converted into a positive voltage VS1 and a negative voltage VS2 with a forward type switching power source circuit 2, these voltages are alternatively changed-over with switches S1 and S2 and are applied to the inductive load Lx, the current flowing through the inductive load Lx is detected by a resistor Rs and the absolute value thereof is compared with a reference voltage Vr after amplified with an absolute value amplifier circuit ABS at a proper degree, the resultant error voltage is again amplified at an error amplifier EA and the amplified output is applied to a PWM circuit PWM to convert the same into a PWM signal, through which a switching transistor Q2 is driven to control the positive voltage VS1 and the negative voltage VS2 in such a manner that the load current is maintained at a predetermined value, wherein the current detecting resistor Rs, the absolute value amplifier circuit ABS, the error amplifier EA, the reference voltage Vr and the PWM circuit inclusively constitute a voltage regulating circuit 5.

With the circuit shown in FIG. 2, in order to rapidly change-over the polarity of a rectangular wave current having a predetermined amplitude flowing through the inductive load Lx, it is necessary to increase the output voltage Vc of the DC power source 1 as large as possible at least during the polarity change-over. However, in the interval when the load current is kept at a constant value after the polarity change-over, the voltage across the inductive load Lx is in principle reduced to zero, therefore when the large value of the output voltage Vc is unchanged, the substantial part thereof is applied to the current control transistor Q1 which increases the power consumption in the current control transistor Q1 to thereby reduce the reliability of the circuit, further the cost for countermeasuring the heat radiation at the current control transistor Q1 increases and the size of the device increases thereby.

For the above reason the output voltage Vc is reduced during the interval when the load current is maintained at a constant value.

In FIG. 3, the current control transistor Q1 as included in the circuit shown in FIG. 2 is eliminated and the output voltages VS1 and VS2 of the switching power source circuit 2 are substantially applied as they are to the inductive load Lx and the resistor Rs so that the power consumption in the current control transistor Q1 as indicated above was eliminated which extremely reduces power consumption in the circuit.

In the circuit shown in FIG. 3, the output voltages VS1 and VS2 are reduced in such a way that the voltage across the inductive load Lx is rendered substantially zero during the time when the rectangular wave current is kept at a perdetermined amplitude, and further during the polarity change-over the voltage across the resistor Rs decreases, such that the output voltages VS1 and VS2 are raised to about their maximum output voltages. However, in the circuit shown in FIG. 3 there are included choke coils CH1 and CH2 and output capacitors C1 and C2 near the inductive load Lx, a parasitic vibration is likely to be induced during the change-over of the output voltages with the switches S1 and S2 and further such vibration is difficult to be suppressed by the feedback loop in the circuit. Namely, in the switching power source circuit the rising rate of the output voltages are controllable, however the lowering rate control thereof is difficult because the output voltage can only be lowered by discharging the current through the inductive load such that once when the output current over-shoots, ringing is induced in the circuit to thereby render it difficult to suppress the parasitic vibration.

FIG. 4 shows a circuit disclosed in JP-A-64-12226 (1989) which is deviced to improve the above problems by combining the advantageous features of the circuits shown in FIG. 2 and FIG. 3.

Namely, the power consumption of the current control transistor Q1 in the circuit of FIG. 2 can be decreased when the collector-emitter voltage Vce thereof is suppressed, therefore in the circuit of FIG. 4 the sum of the collector-emitter voltage Vce and the voltage across the resistor Rs is controlled so as not to exceed a reference voltage Vr2. Further, the parasitic vibration during the current change-over encountered in the circuit of FIG. 3 is suppressed by means of the current control transistor Q1 which serves as a damping resistor.

However, with the circuit shown in FIG. 4 it is difficult to hasten the polarity change-over of the current flowing through the inductive load Lx, namely there remains a problem that a high speed current inversion in the inductive load Lx is difficult, because adjustable voltage range of the switching power source circuit 1 is limited in such a manner that when a lower collector-emitter voltage Vce of the current control transistor Q1 is selected, a higher output voltage Vc can not be obtained.

SUMMARY OF THE INVENTION

An object of the present invention is to overcome the above problems and to provide an alternatable constant current circuit with a small power consumption which changes-over the flow direction of the inductive load current at a high speed and suppresses the palasitic vibration in the inductive load current without expanding the adjustable range of the output voltage of the switching power source circuit and without necessitating an additional heat radiating means.

In the alternatable constant current circuits according to the present invention, the capacity of the output capacitor in a switching power source circuit is lowered, so that the oscillation frequency and Q value of an oscillation circuit including the inductive load increase and during the current inversion in the inductive load the output voltage of the output capacitor increases over the maximum output voltage of the switching power source circuit due to the charging of the output capacitor to thereby hasten the current inversion in the inductive load.

Further, in the alternatable constant current circuits according to the present invention, the anode terminals of diodes, which correspond to the diodes D2 and D4 in the conventional circuit shown in FIG. 4, in a bridge type switching circuit of a polarity inversion circuit are grounded so that a resistance element and a current control element which respectively correspond to the resistor Rs and the current control transistor Q1 in the conventional circuit shown in FIG. 4 and constitute a current regulating circuit 4, are excluded from the oscillation circuit during the charging or regenerating period of the output capacitor to thereby further increase Q value of the oscillation circuit, and further a diode, which corresponds to the diode D5 in the conventional circuit shown in FIG. 4 connected between the collector and emitter of the current control transistor Q1 for preventing reverse voltage application therebetween, is eliminated.

Still further, in the alternatable constant current circuits according to the present invention, the output voltage of the switching power source circuit is controlled so as to maintain the collector-emitter voltage Vce of a current control transistor, which corresponds to the current control transistor Q1 in FIG. 4, at a predetermined value to thereby reduce power consumption in the current control transistor.

Moreover, in the alternatable constant current circuits according to the present invention, the output level of the AC voltage generated by switching a DC power source with a switching transistor, which corresponds to the switching transistor Q2 in the conventional circuit shown in FIG. 4, is further converted via a transformer, thereby the operating point of the switching transistor for an output voltage causing a predetermined steady state current in the inductive load is put away from the operating point of the switching transistor for the maximum output voltage, in other words, the output voltage causing the predetermined steady state current is outputted at an on-time rate (duty factor) of the switching transistor near its minimum rate and the maximum output voltage at an on-time rate of the switching transistor near its maximum rate.

DESCRIPTION OF THE EMBODIMENTS

Figure 2:
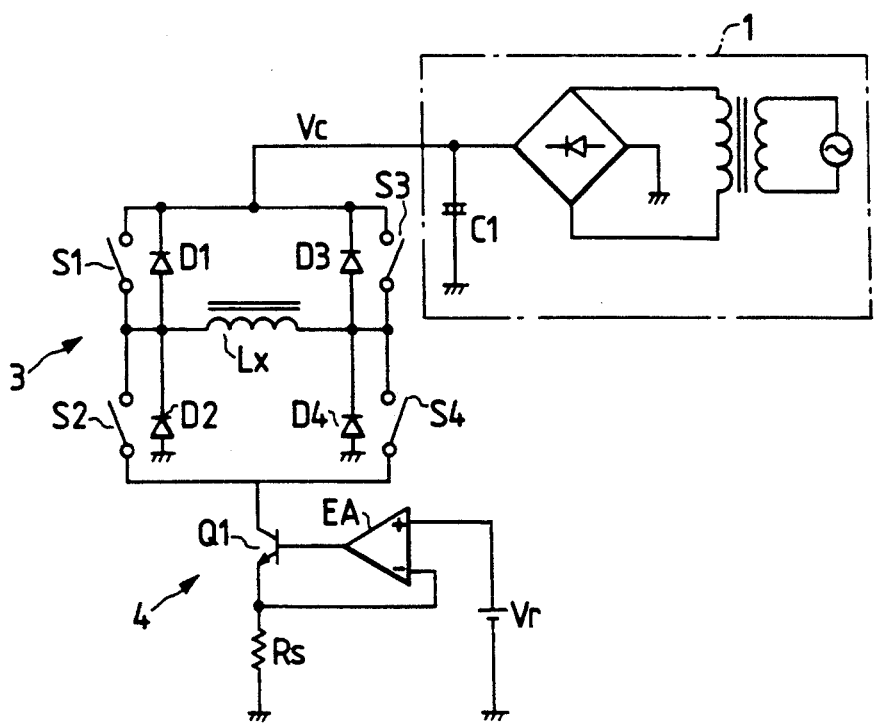
FIG. 2 is a circuit diagram of one conventional alternatable constant current circuit.
Figure 3:
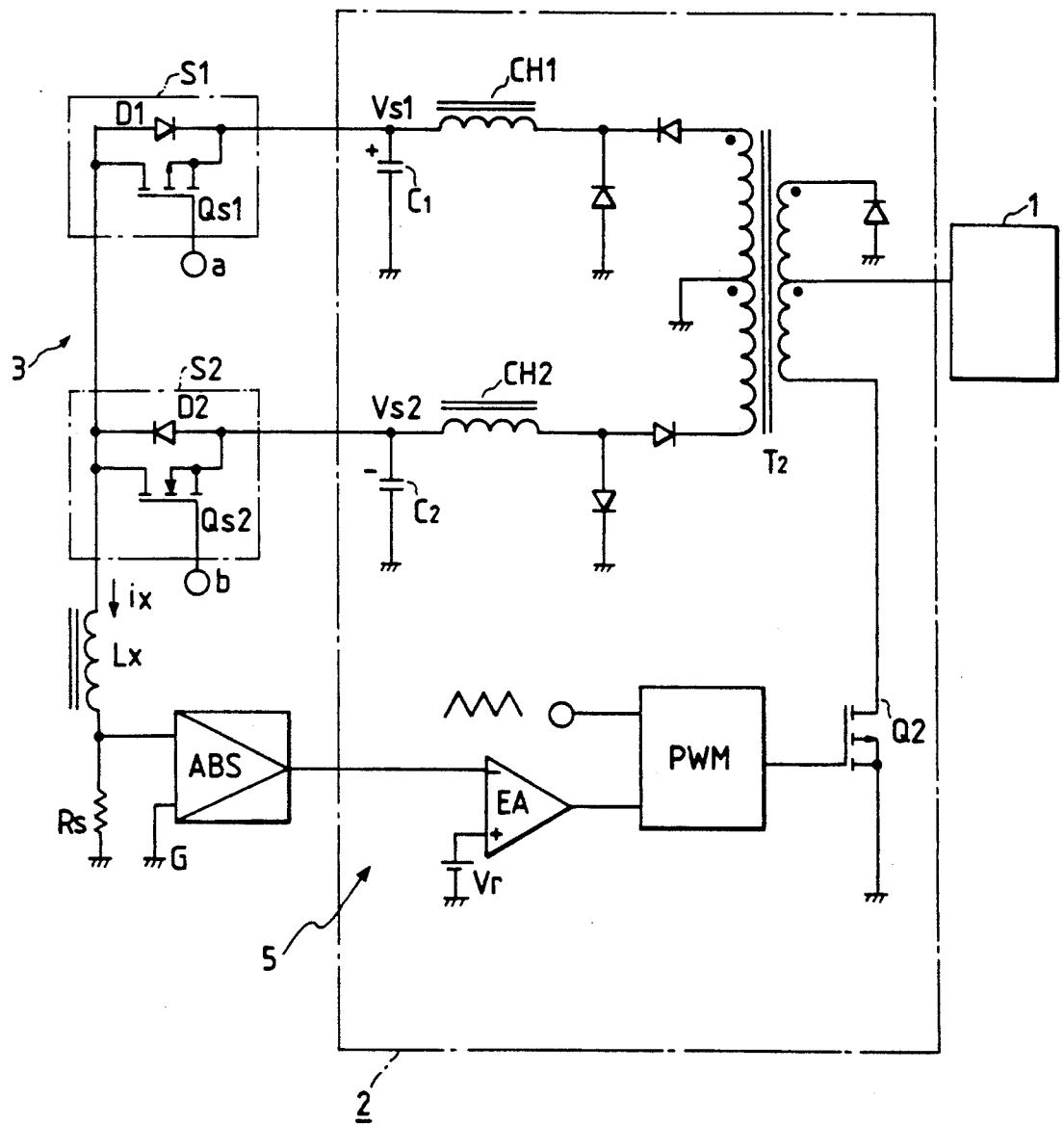
FIG. 3 is a circuit diagram of another conventional alternatable constant current circuit.
Figure 4:
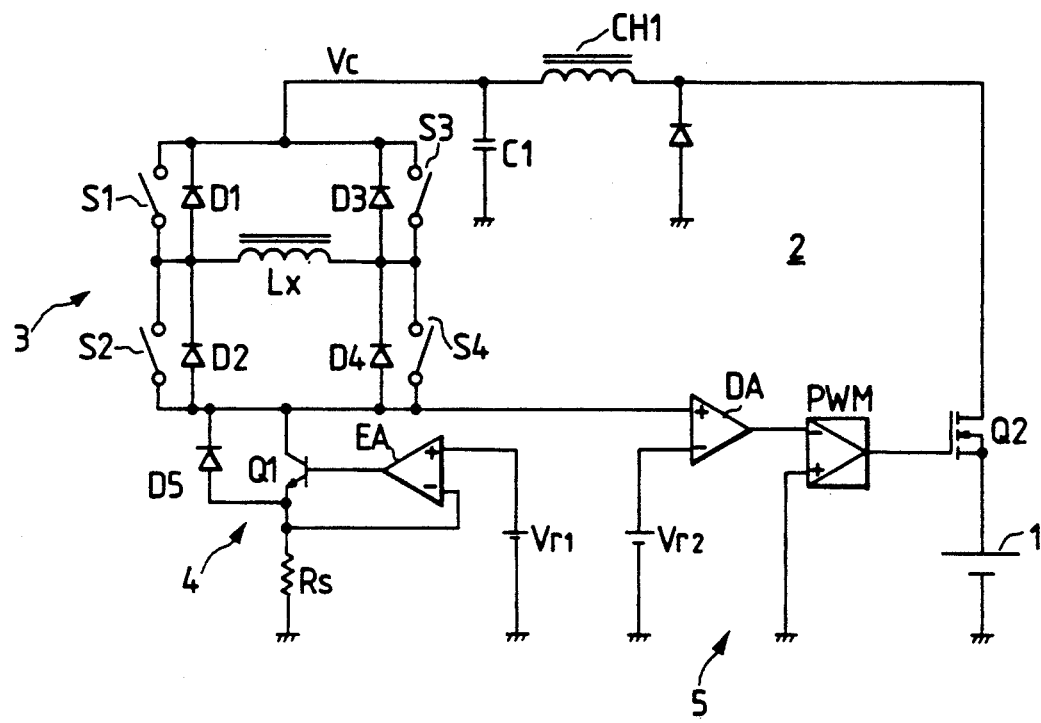
FIG. 4 is a circuit diagram of a further conventional alternatable constant current circuit.

In the drawings in connection with the embodiments according to the present invention, the same or equivalent members as those in the conventional circuits as shown in FIGS. 2, 3 and 4 are designated by the same numerals and symbols.

Figure 1:
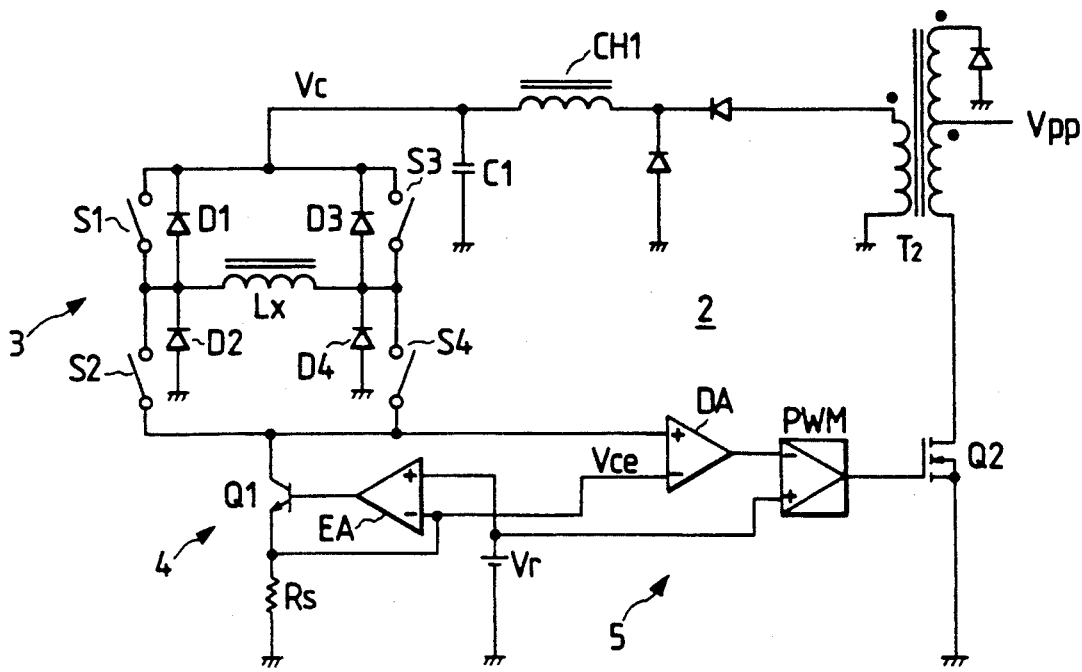
FIG. 1 is a circuit diagram of one embodiment of alternatable constant current circuits according to the present invention.

FIG. 1 is a circuit diagram of an embodiment of alternatable constant current circuits according to the present invention.

When comparing the circuit diagram of the present embodiment with that of the conventional circuit shown in FIG. 4, the following two points primarily differ therefrom, in that, the anodes of the diodes D2 and D4 are grounded and only the collector-emitter voltage Vce of the current control transistor Q1, instead of the collector-emitter voltage Vce plus the voltage across the current detecting resistor Rs, is inputted to the voltage regulating circuit 5 in the switching power source circuit 2.

Figure 5:
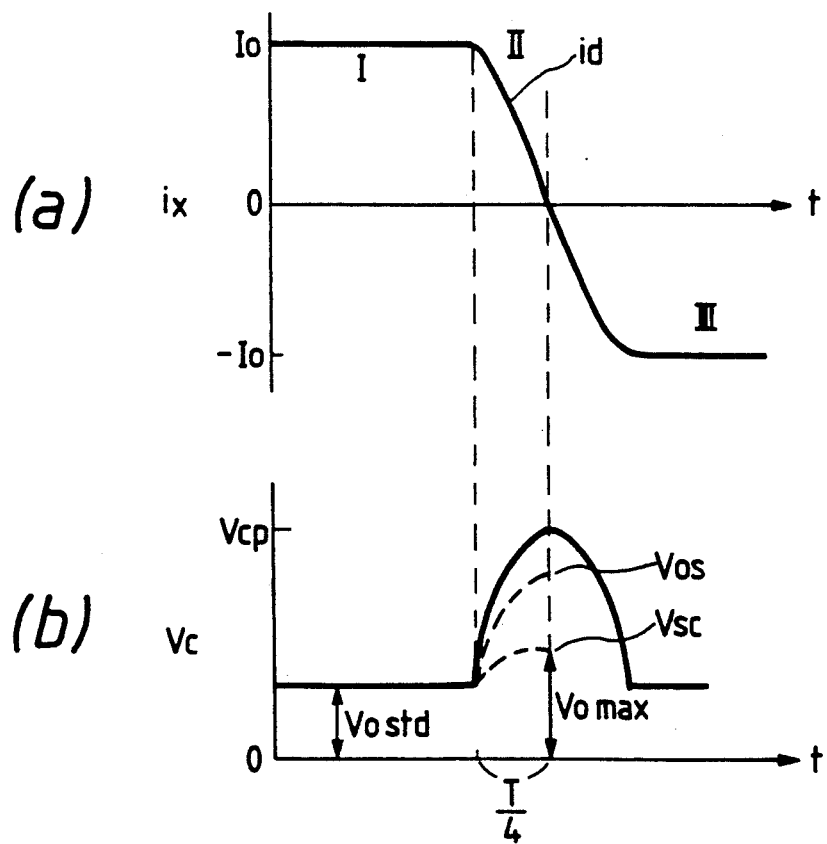
FIG. 5(a) and FIG. 5(b) are diagrams of waveforms appearing in the alternatable constant current circuit shown in FIG. 1 for explaining the operation thereof.

FIG. 5(a) and FIG. 5(b) are views for explaining voltage and current waveforms at points in the circuit shown in FIG. 1.

FIG. 5(a) is a waveform diagram of a current ix flowing through the inductive load Lx. In the drawing, I is an interval wherein the current ix flows through the inductive load Lx in the direction toward the right and is controlled at a predetermined amount Io, and the switches S1 and S4 are closed, likely, during interval III the inverted predetermined current Io flows through the inductive load Lx, and further interval II shows the inversion period of the current ix.

When the switches S1 and S4 are opened, the load current ix flows through the diodes D2 and D3 and attenuates as shown in FIG. 5(a) which is designated as diode current id. When the switches S2 and S3 are closed at the moment when the diode current id reaches to zero or immediately before thereof, the direction of the load current ix changes to the negative direction, increases the amount thereof and reaches to the predetermined amount −Io as shown in FIG. 5(a).

The diode current id charges the capacitor C1 and increases the terminal voltage thereof. Namely, at the moment when the diode current reaches to zero the inductive energy of $Lx \cdot Io^2/2$ in the inductive load Lx is collected into the capacitor C1. Actually, a part of the inductive energy is consumed at the resistance component Rx contained in the inductive load Lx, the collected energy in the capacitor decreases accordingly.

During the course of the inductive energy collection the diode current id flows through the oscillation circuit composed of the inductive load Lx and the capacitor C1, therefore when Q value of the oscillation circuit is large, the terminal voltage Vc of the output capacitor C1 jumps up. The q value of the oscillation circuit is expressed as follows when the resistance component in the diodes is neglected.

$$Q = (1/Rx)\sqrt{(Lx/C1)} \tag{1}$$

Further, the period of the oscillation T is expressed as follows.

$$T = 2\pi\sqrt{(Lx \cdot C1)} \tag{2}$$

From the above two equations, it will be understood that when the amount of the inductive load Lx is given, the lower the amount of the output capacitor C1 is, the larger the Q value and the smaller the period T of the oscillation become.

The diode current id flows only the interval of about T/4 of the oscillation period, therefore assuming that no diode current flows thereafter, the terminal voltage Vc of the output capacitor C1 is kept at the jumped-up value due to the oscillation as indicated by a dotted line Vos in FIG. 5(b).

On the other hand, during the interval when the diode current id is flowing, no current flows through the resistor Rs and further the current which flows through the resistor Rs during the inversion period after the diode current id terminates is lower than the predetermined steady state current Io, therefore the error amplifier EA over-drives the current control transistor Q1. As a result, the current control transistor Q1 saturates and the collector-emitter voltage Vce thereof reduces so that the output voltage of the switching power source circuit 2 increases to its maximum output voltage Vomax as indicated in FIG. 5(b) through the voltage regulating circuit 5 so as to compensate the reduction of the collector-emitter voltage Vce of the current control transistor Q1.

Accordingly, in addition to the jumped-up voltage appeared at the terminal of the output capacitor C1 due to the oscillation as indicated by the dotted line Vos in FIG. 5(b), the output capacitor C1 is further charged by the increased output voltage of the switching power source circuit 2 as indicated by another dotted line Vsc in FIG. 5(b), the output voltage Vc appearing at the terminal of the output capacitor C1 increases over the maximum output voltage Vomax of the switching power source circuit 2 to an output voltage Vcp as indicated by a solid line in FIG. 5(b).

As a result, when the switches S2 and S3 are closed, the voltage Vcp of a few times larger than that of the steady state voltage Vostd is applied at the terminal of the inductive load Lx to hasten the current inversion flowing therethrough and thereafter the terminal voltage Vc lowers due to discharge of the output capacitor C1 and settles at the steady state voltage Vostd.

Contrary to the above, in the conventional circuit as shown in FIG. 4, the capacitance of the capacitor C1 is selected large according to the conventional design concept, in that so as to enable to respond sudden change of resistive load and to increase resistance to ripples from the power source, therefore Q value of the oscillation circuit is extremely low in comparison with that of the present embodiment, accordingly no jump-up voltage which appears at the terminal of the output capacitor C1 due to the increased Q value in the present embodiment is generated. Further, the output voltage increase in the switching power source circuit 2 in response to the decrease of the collector-emitter voltage Vce of the current control transistor Q1 is suppressed because of the large capacitance of the output capacitor C1, therefore such voltage jump-up at the terminal of the output capacitor C1 over the maximum output voltage Vomax of the switching power source circuit 2 during the short current inversion interval according to the present embodiment can not be obtained with the conventional circuit.

Specific oscillation periods T and Q values of the oscillation circuits in the present embodiment as shown in FIG. 1 and in the conventional circuit as shown in FIG. 4 are explained hereinbelow using actual values of their components, in that Lx=1H, Rx (resistance component of the inductive load Lx)=10Ω and Rs=10Ω for the both circuits, and C1 (of the conventional circuit)=1000 μF and C1 (of the present embodiment)=2 μF;

In the present embodiment;

$$T = 8.8 \text{ ms}$$

$$Q = (1/Rx)\sqrt{(Lx/C1)} = 70$$

In the conventional circuit;

$$T = 197 \text{ ms} \tag{3}$$

$$Q = [1/(Rx + Rs)]\sqrt{(Lx/C1)} + 1.6$$

As will be understood from the above specific examples as calculated by using actual values of the respective components, a sufficient jump-up effect of the output voltage Vc at the output capacitor C1 can be obtained at the moment of the current inversion according to the present embodiment, however no such effect can be obtained by the conventional circuit.

In the circuit shown in FIG. 4, the diode current id flowing through the diodes D2 and D4 also flows through the resistor Rs, the Q value of the oscillation circuit in FIG. 4 is expressed as in the equation (3) above wherein the internal resistance component in the current control transistor Q1 is neglected.

Further, even when the capacitance value of 2 μF is selected for the conventional output capacitor C1 in place of the conventional value of 1000 μF, the resultant Q value of the modified oscillation circuit is 35 which is still lower than the Q value 70 of the present embodiment.

Further, the output voltage Vc of the switching power source circuit 2 are controlled so that the collector-emitter voltage Vce of the current control transistor Q1 coincides with a reference voltage Vr, therefore the power consumption in the current control transistor Q1 is kept constant regardless to the amount of the inductive load current Io, thereby the increase of power consumption in the circuit is prevented which was encountered in the conventional circuits during the predetermined steady state current conduction.

Figure 6:
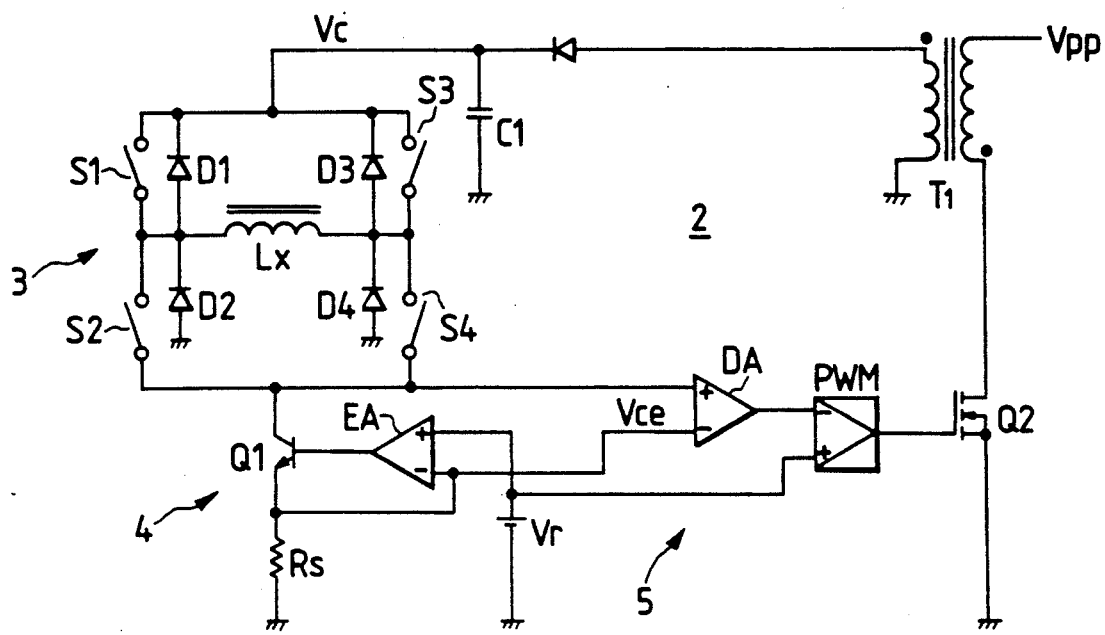
FIG. 6 is a circuit diagram of another embodiment of alternatable constant current circuits according to the present invention.

FIG. 6 is a circuit diagram of another embodiment of the present invention which uses a flyback type switching power source circuit 2.

The circuit shown in FIG. 6 is substantially the same as that shown in FIG. 1 except for the circuit constitution of the switching power source circuit 2.

In the embodiment circuits according to the present invention as shown in FIG. 1 and FIG. 6, the switching circuit portion 3 for the inductive load Lx is isolated from the primary power source circuit by the transformer T1 or T2 which is generally advantageous for a measuring instrument use and is further advantageous because the center value of the on-time rate (duty factor) of the switching transistor Q2 can be properly selected by modifying the turn ratio of the transformer.

For example, when the output voltage inducing the steady state current Io is outputted at an on-time rate near its minimum rate and at another on-time rate near its maximum rate the maximum output voltage is outputted, the increased portion in the output voltage with the switching power source circuit 2 as indicated by the dotted line Vsc in FIG. 5(b) is maximized to thereby hasten the change-over of the current flow direction in the inductive load.

Further, when MOS transistors are used for the switching elements S1–S4 in the embodiment circuits according to the present invention as shown in FIG. 1 and FIG. 6, the diodes D1–D4 are eliminated.

Figure 7:
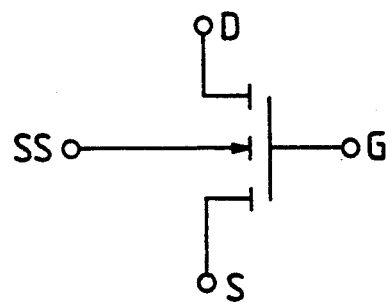
FIG. 7 is a diagram of a MOS transistor illustrated in a symbolic form used in the present invention.

FIG. 7 is a diagram of a MOS transistor illustrated in a symbolic form. In a MOS transistor such as illustrated in FIG. 7, the conductivity between the drain D and the source S is controlled by the voltage between the gate G and the source S. On one hand, since a PN junction is formed between the substrate SS and the channel, when MOS transistors in which the electrode of the substrate SS is connected to the source S are used for the switching elements S1 and S3, the diodes D1 and D3 are eliminated. Further, when MOS transistors in which the electrode of the substrate SS is grounded are used for the switching elements S2 and S4, the diodes D2 and D4 are eliminated.

Figure 8:
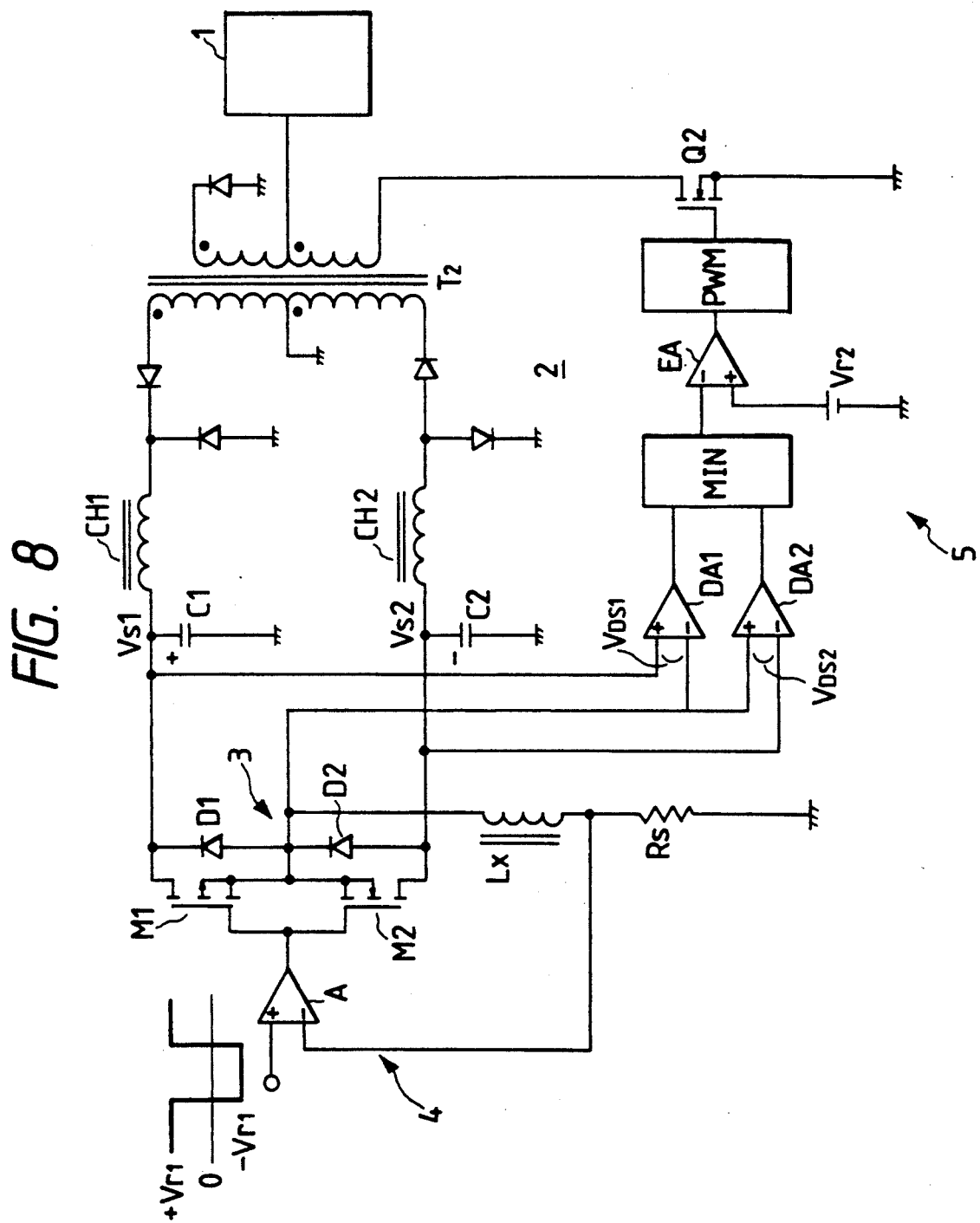
FIG. 8 is a circuit diagram of a further embodiment of alternatable constant current circuits according to the present invention.

FIG. 8 is a circuit diagram of a further embodiment according to the present invention which includes a switching power source circuit 2 with two output voltages of positive and negative potentials like that shown in FIG. 3.

In FIG. 8, MOS transistors M1 and M2 are formed in a well known source follower type push-pull circuit and constitute an output stage of an amplifier A. The inductive load Lx is driven by the push-pull circuit formed by the MOS transistors M1 and M2, the inductive load current is detected at a resistor Rs and fed-back to the amplifier A and is compared there with a rectangular wave voltage having a predetermined reference amplitude of Vr1.

In the operation of the above circuit, when the MOS transistors M1 and M2 are driven to their saturation, the MOS transistors M1 and M2 operate in the same manner as that of the switches S1 and S2 as shown in FIG. 3 to thereby switch the voltages VS1 and VS2 alternatively to the inductive load Lx.

However, under such operating condition, the inductive load current flowing through the resistor Rs can not be controlled, it is necessary to operate the MOS transistors M1 and M2 under a non-saturated condition. When the push-pull circuit of the MOS transistors M1 and M2 is operated under a non-saturated condition thereof, the push-pull circuit simultaneously performs the change-over between voltages VS1 and VS2 as well as the control of the current flowing through the inductive load at a predetermined value to thereby suppress the parasitic vibration induced during the current inversion which was encountered in the conventional circuit as shown in FIG. 3. Namely, during the operation under the non-saturated condition, the MOS transistors M1 and M2 respectively perform the function of the switches S1 and S2 as shown in FIG. 3 as well as the function of the current control transistor Q1 as shown in FIG. 1.

Further, the capacitances of the capacitors C1 and C2 are lowered as in the circuit shown in FIG. 1 in order to increase Q value in the respective oscillation circuits, the inductive load current flows into the capacitor C2 via the diode D2 after the interruption of the MOS transistor M1 to jump-up the voltage VS2 at the terminal of the output capacitor C2 into the negative direction and in the same manner after the interruption of the MOS transistor M2 the voltage VS1 at the terminal of the output capacitor C1 jumps-up into the positive direction to thereby hasten the inversion of the inductive load current.

Still further, when the MOS transistors M1 and M2 are operated under their non-saturated conditions the power consumption therein increases therefore it becomes necessary to suppress the respective drain-source voltages VDS to a low level. For this reason, the drain-source voltages VDS1 and VDS2 of the MOS transistors M1 and M2 are detected with respective differential amplifiers DA1 and DA2, of which outputs are applied to a minimum value selection circuit M1N wherein a minimum value out of the respective drain-source voltages VDS1 and VdS2 is determined and the output voltage of the switching power source circuit 2 is controlled via an error amplifier EA and a PWM circuit PWM so that the determined minimum value coincides with a second reference voltage Vr2.

According to the present invention, alternatable constant current circuit suitable for supplying a rectangular wave current to an inductive load such as in an exciting circuit of an electromagnetic flowmeter and in a slanted magnetic field system of a nuclear magnetic resonance imaging device with a short current inversion time as well as with a reduced power consumption therein.

I claim:

1. An alternatable constant current circuit comprising,
a switching power source circuit supplying power to an inductive load, said switching power source circuit including, a transformer, a DC power source connected to the primary side of the transformer, switching means connected to the primary side of the transformer for switching the DC power source to induce AC voltage at the secondary side of the transformer, a rectifier for rectifying AC current caused by the induced AC voltage at the secondary side of the transformer and an output capacitor charged by the recified DC current from the rectifier;
a polarity inversion circuit which changes-over application polarity of the output voltage from the output capacitor on the inductive load to thereby invert the direction of current flowing therethrough;

a current regulating circuit including a resistance element for detecting the current flowing through the inductive load and a current control element for regulating the current flowing through the inductive load at a predetermined value with reference to the detected current via the resistance element;

a voltage regulating circuit which regulates the induced AC voltage at the secondary side of the transformer through control of the switching means by comparing a voltage appearing at the current control element with a reference voltage, wherein the capacitance of the output capacitor is so determined that the output voltage of the output capacitor rises over the maximum induced AC voltage appearing at the secondary side of the transformer during the inversion of current flowing through the inductive load with said polarity inversion circuit.

2. An alternatable constant current circuit according to claim 1, wherein said polarity inversion circuit is a bridge type switching circuit.

3. An alternatable constant current circuit according to claim 1, wherein said switching power source circuit includes two output capacitors which output voltages of opposite polarities from each other and said polarity inversion circuit is constituted by a switching circuit which changes-over the two output voltages.

4. An alternatable constant current circuit according to claim 1, wherein said polarity inversion circuit comprises a bridge type switching circuit including a parallel connection of a series connection of first and second switching elements and a series connection of third and fourth switching elements connected between an output terminal of the switching power source circuit and the current regulating circuit, and a diode bridge circuit including a parallel connection of a series connection circuit of first and second diodes and a series connection circuit of third and fourth diodes connected between the output terminals of the switching power source circuit in such a manner that the conductive direction thereof being opposed to that of the power source voltage and further wherein the juncture of the first and second diodes is connected to the juncture of the first and second switching elements and the juncture of the third and fourth diodes is connected to the juncture of the third and fourth switching elements.

* * * * *